(12) United States Patent
Smahl et al.

(10) Patent No.: US 7,007,716 B2
(45) Date of Patent: Mar. 7, 2006

(54) BRANCHTUBING FOR PIPEWORK

(75) Inventors: Jarmo Smahl, Nastola (FI); Jyri Järvenkylä, Hollola (FI)

(73) Assignee: Uponor Innovation AB, Fristad (SE)

( * ) Notice: Subject to any disclaimer, the term of this patent is extended or adjusted under 35 U.S.C. 154(b) by 0 days.

(21) Appl. No.: 10/752,787

(22) Filed: Jan. 7, 2004

(65) Prior Publication Data

US 2004/0168727 A1    Sep. 2, 2004

Related U.S. Application Data

(63) Continuation of application No. PCT/FI02/00615, filed on Jul. 5, 2002.

(30) Foreign Application Priority Data

Jul. 6, 2001  (FI) ............................... 20010275 U
Dec. 13, 2001  (FI) ............................... 20012460

(51) Int. Cl.
*F16L 23/00* (2006.01)

(52) U.S. Cl. .................. 137/561 A; 285/364; 285/407; 285/415

(58) Field of Classification Search ............ 137/561 A; 285/415, 364, 406, 407
See application file for complete search history.

(56) References Cited

U.S. PATENT DOCUMENTS

| | | | |
|---|---|---|---|
| 2,311,708 A | 2/1943 | Sundholm | 284/14 |
| 2,419,453 A | 4/1947 | Kocevar | 285/160 |
| 3,918,748 A * | 11/1975 | Acda | 285/21.3 |
| 4,624,487 A * | 11/1986 | Thalmann | 285/197 |
| 4,893,733 A * | 1/1990 | Thomsen | 222/559 |
| 4,913,183 A * | 4/1990 | Vogel et al. | 137/15.08 |
| 5,125,431 A * | 6/1992 | Vogel et al. | 137/561 A |
| 5,251,938 A | 10/1993 | Ericksen | |
| 5,307,995 A | 5/1994 | Jackson et al. | 239/373 |
| 5,375,889 A | 12/1994 | Nakashiba et al. | 285/21 |
| 5,868,439 A | 2/1999 | Schmidt | 285/127.2 |
| 5,957,505 A | 9/1999 | Jarvenkyla | 285/125.1 |
| 6,672,324 B1 | 1/2004 | Jarvenkyla | 137/15.01 |

FOREIGN PATENT DOCUMENTS

| | | |
|---|---|---|
| DE | 41 39 814 A1 | 9/1993 |
| DE | 43 08 435 A1 | 9/1994 |
| DE | 195 10 714 C1 | 3/1996 |
| DE | 199 61 455 A1 | 6/2000 |
| EP | 0 458 076 A1 | 11/1991 |
| EP | 0 556 767 B1 | 6/1996 |
| GB | 1103936 | 2/1968 |
| JP | 7-167365 | 7/1995 |
| JP | 11-148588 | 6/1999 |
| SE | 118 388 | 3/1947 |
| WO | WO 00/57097 | 9/2000 |

* cited by examiner

Primary Examiner—A. Michael Chambers
(74) Attorney, Agent, or Firm—Fish & Richardson P.C.

(57) ABSTRACT

The invention relates to a branch piece for a pipework, comprising a body (1) including at least one branch fitting (2). A connecting piece (3) is arrangeable in the branch fitting (2). The branch piece includes a locking means made up of one or more parts for locking the connecting piece (3) in place.

18 Claims, 2 Drawing Sheets

BRANCHTUBING FOR PIPEWORK

CROSS REFERENCES TO RELATED APPLICATIONS

This application is a Continuation of International Application PCT/FI02/00615 filed on Jul. 5, 2002, which designated the U.S. and was published under PCT Article 21(2) in English.

BACKGROUND OF THE INVENTION

The invention relates to a branch piece for a pipework, comprising a body including at least one branch fitting.

FIELD OF THE INVENTION

Branch pieces are used in pipeworks e.g. at points where liquid flowing in a pipework is conveyed to flow from a main pipe further to a branch pipe as well. A bypass manifold is a branch piece for a pipework. Such a bypass manifold comprises a body including several branch fittings. Liquid is conveyed to the bypass manifold along a main pipe while the branch fittings are provided with branch pipes, the bypass manifold thus dividing the liquid from the main pipe into the several branch pipes. Typically, bypass manifolds are used e.g. in tap water systems and heating systems, such as in floor heating systems.

Branch pipes are fastened to branch fittings e.g. by a locking piece or a welded joint. WO Publication no. 00/57097 discloses a solution wherein branch pipes are connected to branch fittings by means of a rotatable locking piece. U.S. Pat. No. 5,375,889, on the other hand, discloses a solution wherein branch pipes and branch fittings are welded together. It is quite difficult and time consuming to employ such methods for connecting the branch pipes to the branch fittings. It is particularly difficult to implement joints in places of limited size e.g. when installing a bypass manifold next to a wall. In connection with the implementation of a welded joint, the range of materials of the branch pipes and branch fittings is quite limited. Another particular problem is, however, that to a certain bypass manifold can be connected pipes of one particular size only.

JP Publication 7167365 discloses a solution which enables two pipes having different diameters to be connected to a bypass manifold. In JP Publication 7167365, a branch fitting is provided with steps to enable the outer part of the branch fitting to be provided with a branch pipe having a smaller diameter. When a pipe having a larger diameter is to be connected to the bypass manifold, an outer step is removed and the branch pipe is connected to the root part of the branch fitting. The joints of the pipes are sealed by welding. This limits the range of materials the branch fittings and branch pipes can be made of. Furthermore, the size of the branch pipes is limited to two different diameters only. In addition, the structure of the branch fitting arrangement is complex and difficult.

BRIEF SUMMARY OF THE INVENTION

An object of the present invention is to provide a novel and versatile branch piece for a pipework.

The branch piece of the invention is characterized in that a connecting piece is arrangeable in the branch fitting and the branch piece includes a locking means made up of one or more parts for locking the connecting piece in place.

The idea underlying the invention is that a branch piece comprises a body including a branch fitting for a connecting piece. The branch piece includes locking means for locking the connecting piece in place. Preferably, the branch piece is a bypass manifold and the structure of the bypass manifold forms a module system such that different connecting pieces can be connected to the body of the bypass manifold and they can be locked in place in a reliable and tight manner. Particularly preferably, the ends of the branch fittings of the body of the bypass manifold into which the connecting pieces are to be arranged are standard measure ones such that the part to be arranged in the branch fitting of the connecting piece is similar in every connecting piece. Preferably, the connecting piece includes an outlet fitting from which a branch pipe is arranged to extend or into which a pipework component is arranged. The sizes of the outlet fittings may vary as necessary, depending on the dimensions of the branch pipe.

An advantage of the invention is that it enables various different connecting pieces to be used in connection with a branch piece. Using a connecting piece, branch pipes e.g. of different sizes and even of different materials can thus be connected to the same branch piece. The body of a bypass manifold may always be similar despite the fact that the bypass manifold is provided with different outlet fittings. The body of the bypass manifold can thus be manufactured using a single mould where there is no need whatsoever to take into account the fact that branch pipes of different sizes may extend from the bypass manifold. On the other hand, the body of the bypass manifold may also be manufactured by continuous extrusion e.g. as disclosed in DE 19 961 455. The connecting pieces may be highly different and they may include even metallic thread components. Furthermore, the connecting pieces may include a metallic part and a plastic part that are combined e.g. such that the metallic part is arranged inside a plastic layer. The manufacture of connecting pieces may also be made simple and easy such that the connecting pieces are manufactured in a mould including a standard length part on the side of the connecting piece to be arranged in the branch fitting of a bypass manifold, wherein different mould inserts may be used for providing the other ends constituting the outlet fitting of a connecting piece. When the solution of the invention is used, pipes, for example, can be connected to a bypass manifold in a fast, simple and easy manner. Branch pipes or components to be fastened to outlet fittings, for example, can be connected to the outlet fittings prior to connecting the outlet fitting to the branch piece. In such a case, a thread or welded joint does thus not have to be implemented in the immediate vicinity of the branch piece; consequently, there is no need to arrange any space in the branch piece or in the vicinity thereof for the implementation of such joints. The branch piece may thus be small and it can be installed in a place of a limited size, and yet the connecting work is effortless and easy to carry out. Furthermore, at the end facing the body of the branch piece, the connecting pieces can be rounded or bevelled in a desired manner. Such a structure is extremely preferable as far as the flow is concerned since the formation of vortices can thus be minimized.

BRIEF DESCRIPTION OF THE DRAWINGS

The invention will be described in closer detail in the accompanying drawing, in which.

DETAILED DESCRIPTION OF THE INVENTION

Figure 1:
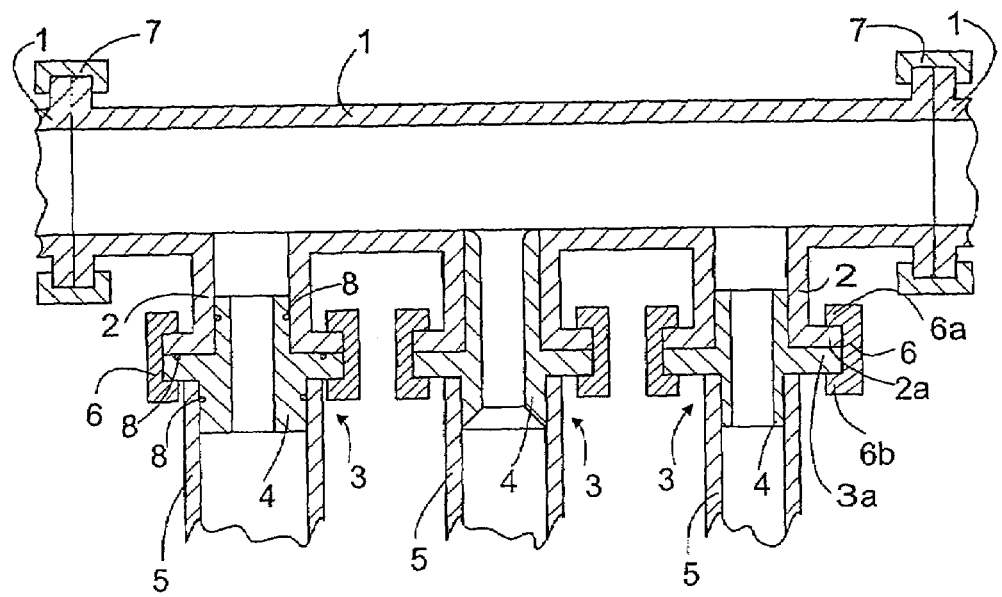
FIG. 1 is a schematic cross sectional side view showing a bypass manifold.

FIG. 1 shows a bypass manifold including a body 1 including several branch fittings 2. The branch fittings 2 are all substantially similar. Connecting pieces 3 are arranged in connection with the branch fitting 2. At the end to be arranged in connection with the branch fittings 2 of the body 1 of the bypass manifold, the connecting pieces 3 are all similar. The connecting piece 3 also includes an outlet fitting 4 into which a branch pipe 5 extending from the bypass manifold is to be arranged in the case of FIG. 1. The outlet fittings 4 of the connecting pieces 3 are different. Consequently, the solution of FIG. 1 enables three different branch pipes 5 to be connected to the bypass manifold despite the fact that all branch fittings 2 of the bypass manifold are precisely similar.

The connecting pieces 3 are locked reliably and tightly into the branch fittings 2 e.g. by means of locking pieces 6. For joint sealing, a joint may also be provided with seals, such as O ring seals 8. The locking piece 6 locks the connecting piece 3 and the branch fitting 2 together such that the branch fitting 2 is provided with a flange 2a and the connecting piece is provided with a flange 3a, correspondingly. The locking piece 6, in turn, is provided with two flanges 6a and 6b, between which the flange 2a of the branch fitting and the flange 3a of the connecting piece are to be arranged. An O ring seal 8 can be arranged e.g. around the connecting piece 3 between the connecting piece 3 and the branch fitting 2 as well as between the connecting piece 3 and the branch pipe 5. The O ring seal 8 may also be arranged between the flange 2a of the branch fitting and the flange 3a of the connecting piece. A groove into which the O ring seal 8 is to be arranged can be located either in the branch fitting 2 or in the connecting piece 3, or both. Most preferably, the groove is provided in the connecting piece 3, which makes the body 1 and the branch fitting 2 simple and easy to manufacture.

Figure 2:
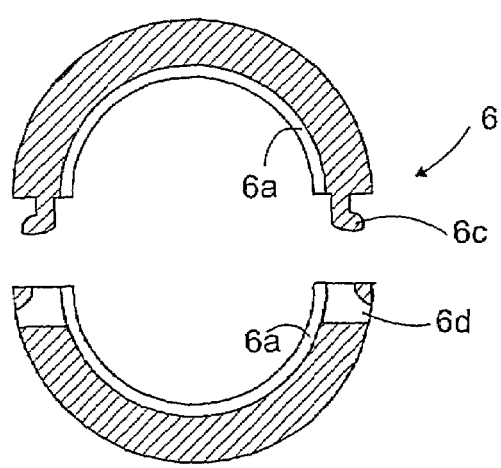
FIG. 2 is a schematic cross sectional side view showing a locking piece.

The locking piece 6 may be e.g. of the type shown in FIG. 2. The locking piece 6 of FIG. 2 includes two substantially semicircular parts to be pressed to each other when the connecting part 3 is locked into the branch fitting 2. One half of the locking piece 6 may be provided with a projection 6c while the other half is provided with an indentation 6d, enabling the different halves of the locking piece 6 to be locked together by snapping them together. Such a locking is thus referred to as a quick fastening or snap fastening. The locking piece 6 may also have its halves are hinged together at one end while the other end is provided e.g. with the quick fastening described in FIG. 2. Furthermore, the halves of the locking piece 6 may be fastened to each other by screws. A bypass manifold can also be fastened at its end to an adjacent bypass manifold or a connecting piece or a plug by a locking piece 7, whose structure may correspond with that of the locking piece 6 disclosed in FIG. 2.

The bypass manifold of the invention can be used e.g. in connection with tap water systems or in heating systems, such as floor heating systems or radiator heating systems. The bypass manifold can be manufactured e.g. of a plastic material, such as polyphenyl sulphone PPSU, polysulphone PSU, polyamide PA, random polypropylene PPr or crosslinked polyethene PEX. The material may be either unreinforced or reinforced or blended. The bypass manifold may also be manufactured of a metallic material, such as brass.

The connecting pieces 3 may be made either of plastic or metal. It is also possible to manufacture the connecting pieces 3 partly of plastic and partly of metal, e.g. such that the connecting piece 3 is a multilayer solution including metallic parts arranged inside a plastic layer.

The end of the connecting piece 3 facing the body 1 may be rounded, as shown in connection with the middle branch fitting 2 of FIG. 1. The aim of such a solution is to avoid the formation of angles which cause vortices in the flow. As far as the flow is concerned, such a solution is thus extremely good. A solution wherein one end of the connecting piece 3 is provided with a bevel also results in a moderate amount of vortices. The outlet fitting 4 of the connecting piece 3 may also be rounded or bevelled to reduce the formation of vortices, thus enhancing the flow.

The branch pipes 5 may be fastened to the outlet fittings 4 in any known method known per se. For example, a welded joint or a separate locking piece may thus be used for connecting the branch pipe 5 to the outlet fitting 4. Furthermore, if the outlet fitting of the connecting piece 3 is made of metal, a thread joint, for instance, may also be used for connecting the branch pipe.

The branch fitting 2 and the connecting piece 3 may also be provided with locking means to prevent the connecting piece 3 from rotating with respect to the branch fitting 2. The means may include e.g. an elevation, a projection or a rib provided in one piece and a groove or a recess at a corresponding point in the other piece. The connecting piece 3 not being allowed to rotate with respect to the branch fitting 2 enables sealing problems between the connecting piece 3 and the branch fitting 2 to be avoided. Furthermore, if the branch pipe 5 is fastened to the outlet fitting 4 by a thread joint, it is preferable to prevent the connecting piece 3 from rotating with respect to the branch fitting 2. On the other hand, a joint wherein the connecting piece 3 is allowed to rotate with respect to the branch fitting 2 can be provided by using O ring seals 8. In such a case, the branch pipe 5, for instance, which is in advance fastened to the connecting piece 3 e.g. by a hydraulic press joint, can be rotated all the way to the bypass manifold.

The locking piece 6 may be arranged to lock one connecting piece 3 at a time to the branch fitting 2, as shown in FIG. 1. Most preferably, however, one locking piece 6 is arranged to extend over several branch fittings 2 and connecting pieces 3, one locking piece 6 thus being used for locking several connecting pieces 3 in place to their own branch fitting 2. It is also possible that one locking piece enables all connecting pieces 3 and, in addition, the pieces to be arranged at the ends of the body 1 to be locked in place. One locking piece is thus capable of replacing e.g. all locking pieces 6 and 7 shown in FIG. 1. When the locking piece 6 is made up of two parts, e.g. as shown in FIG. 2, or its parts are hinged together, it is easy to arrange in place after the connecting piece has been arranged in connection with the branch fitting 2.

Preferably, the materials of the locking piece 6 and the flanges 2a and 3a are selected such that the thermal expansion coefficient of the locking piece 6 is equal to or smaller than the thermal expansion coefficient of the flanges 2a and 3a. If the thermal expansion coefficients are to be equal, the locking piece 6 and the flanges 2a and 3a are made up of the same material, for example. If the thermal expansion coefficient of the locking piece 6 is to be smaller than the thermal expansion coefficient of the flanges 2a and 3a, the locking piece 6 is made up e.g. of glass reinforced polyphenyl sulphone PPSU while the flanges 2a and 3a are made up e.g. of ordinary polyphenyl sulphone PPSU. If the thermal expansion coefficients are equal, variations in temperature does not change the way in which the locking piece 6 is pressed around the flanges 2a and 3a. If, on the other hand, the thermal expansion coefficient of the locking piece 6 is smaller than the thermal expansion coefficient of the flanges 2a and 3a, the locking piece 6 is pressed more tightly around the flanges 2a and 3a when temperature rises.

The connecting piece 3 can be used e.g. as a flow rate controller such that an opening inside the connecting piece 3 determines the volume of the flow conveyed to the branch pipe 5. In floor heating systems, for example, it is necessary to control the volume of the flow conveyed to each branch pipe 5. Today, valves are used for flow control but in order to control the flow in the most suitable manner, a connecting piece is selected whose opening in the middle is of the appropriate size. The control is carried out during installation and, typically, there is no need to change the particular control. It is, however, fairly simple to change the control by replacing the connecting piece.

Furthermore, flow control can also be implemented automatically by providing the connecting piece with such a structure that a change in temperature causes a change in the diameter of the opening inside the connecting piece 3. The solution may utilize e.g. a memory of a material. Thus, in such a case, a rise in temperature results in a change in the material that reduces the diameter of the opening inside of the connecting piece 3.

Figure 3:
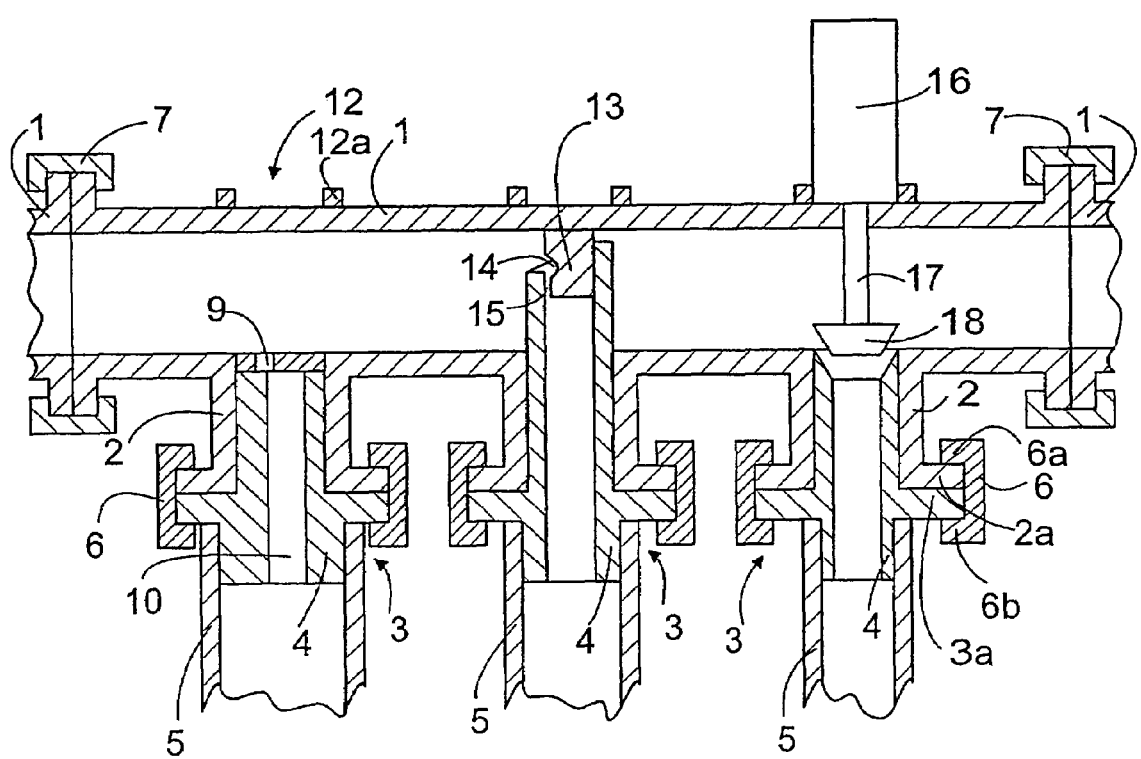
FIG. 3 is a schematic cross sectional side view showing another bypass manifold.

Flow control may also be implemented as shown in connection with the leftmost branch fitting 2 of FIG. 3. The branch fitting 2 is provided with an eccentric choke opening 9. The connecting piece 3 is also provided with an eccentric flow opening 10. The volume of the flow allowed to pass through depends on the position in which the connecting piece has been installed. In FIG. 3, the connecting piece 3 has been installed in a position wherein the flow is at its smallest. By rotating the connecting piece 3 by 180° the flow would be at its largest. The connecting piece 3 and the branch fitting 2 can be manufactured to enable the connecting piece 3 to be installed e.g. in four different positions, the flow through the connecting piece 3 varying in dependence on the position.

FIG. 3 also shows that at an opposite side of the branch fitting 2, the body 1 may be provided with a hole preform 12 to be opened when necessary, e.g. for the installation of a pipework component or a related actuator or in order to connect a branch pipe. In connection with the hole preform 12, a support flange 12a is also provided.

The flow may also be controlled as shown in FIG. 3 in connection with the middle branch fitting 2. The length of the connecting piece 3 may e.g. be varied, in which case the volume of the flow is determined according to how close one end of the connecting piece 3 comes to the backside wall of the body 1. The backside wall of the body 1 may also be provided with a plug 13 that settles inside the connecting piece 3. The plug 13 may also be provided with a groove 14 and a gap 15 to enable liquid to flow into the groove 14 and along the gap 15 between the plug 13 and the connecting piece 3 further through the connecting piece 3. Making one side of the connecting piece 3 longer than the other enables the flow to be controlled by rotating the connecting piece 3. In the embodiment shown in connection with the middle branch fitting 2 of FIG. 3, for example, the flow is at its largest, and rotating the connecting unit 3 by 180° would settle one end of the connecting unit 3 above the groove 14, closing the flow path. If the diameter of the branch fitting 2 is sufficiently smaller than the diameter of the body 1, the connecting piece 3 does not substantially hinder the flow in the axial direction of the body 1.

Flow control may also be implemented by a valve structure, as shown in connection with the rightmost branch fitting 2 of FIG. 3. The end of the connecting unit 3 facing the body 1 is a conical sealing surface. An actuator 16 is fastened to the body 1, being supported against the support flange 12a. The actuator 16 is used for moving a conical sealing member 18 installed at one end of a pin 17. The sealing thus takes place between the conical sealing member 18 and one end of the conical connecting piece 3. Such a solution enables a substantially linear flow response to be achieved fairly easily. In such a solution, the connecting piece 3 is most preferably made of a highly wear resistant material. The connecting piece may be made e.g. of a glass-reinforced material. In the solution of the invention, it is thus not necessary for the entire branch piece to be made of a reinforced material but it will suffice that e.g. only the connecting piece 3 is made of a reinforced, and thus often more expensive, material. While installing the valve solution, it will suffice that the body 1 is provided with a reasonably small opening for the pin 17 since it is possible to install the sealing member 18 from the branch fitting 2 side by connecting it to the pin 17 e.g. by a thread. The connecting piece 3 is installed in place only after fastening the sealing member 18. The sealing surface of the connecting piece 3 can be arranged to reside inside the branch fitting 2 at a distance from the body 1. In such a case, the sealing member 18 can be arranged at one end of a pin 17 long enough to enable the sealing member 18 substantially in its entirety to reside inside the branch fitting 2 also when the sealing member 18 is arranged in a position in which the valve is open. In such a case, it is the pin 17 only that resides inside the body 1; therefore, no substantial obstacle exists to the flow in the axial direction of the body 1.

The drawing and the related description are only intended to illustrate the idea of the invention. In its details, the invention may vary within the scope of the claims. The locking means for locking the connecting piece 3 in connection with the branch fitting 2 may thus be formed in many different ways. The connecting piece 3 may be locked to the branch fitting 2 e.g. by a screw fastening or by gluing or by a welded joint or by the locking piece shown in the accompanying figures or by another locking piece. The welded joint may be implemented e.g. such that the flange 3a of the connecting piece is, on the surface facing the flange 2a of the branch fitting thereof, provided with a spiral electric welding resistor. An electric welding cylinder may also be provided on a cylinder surface to be installed inside the branch fitting 2 of the connecting piece 3. Alternatively, the above mentioned surfaces may be provided with a surface heatable and weldable in another manner. A screw fastening, for example, may be used for locking the locking piece. Preferably, the body 1 of the bypass manifold is provided with ribs, in which case its wall thickness may be fairly small, the structure of the bypass manifold still being strong and firm.

The structure and purpose of use of the connecting piece 3 may vary. The connecting piece 3 may constitute a pipework component, e.g. a thermometer, flow meter or a venting valve or another valve, such as a closing valve or a control valve. The inner structure of the valve may be a back pressure valve. The connecting piece 3 may further include e.g. a ball valve body, the ball therein being rotatable e.g. by a dwang installed in a transverse direction with respect to the axial direction of the connecting piece. The connecting piece 3 may further include an outlet fitting 4 in which a pipework component is to be installed. Preferably, the axial direction of the body 1 of the branch piece is different than the axial direction of the branch fitting 2. Most preferably, the axial direction of the body 1 is substantially perpendicular to the axial direction of the branch fitting 2, as shown in FIGS. 1 and 3. If there is only one branch fitting 2, its axial direction may, however, be the same as the axial direction of the body 1, or the branch piece may constitute a bend. Furthermore, the branch piece is not necessarily a bypass manifold but the branch piece may be e.g. a branching piece for sprinkler pipes. In such a case, a sprinkler system pipe or pipes enter(s) and exit(s) the branch piece, and a connecting piece 3 is arranged in the branch fitting 2 of the branch piece to serve as a nozzle of the sprinkler system. Most preferably, the body 1 and the branch fittings 2 have a circular cross section, but other shapes are also possible. The cross section of the body 1 may be e.g. a rectangular, in which case the branch fittings 2 may be curved or rectangular as well of another shape.

What is claimed is:

1. A branch piece for a pipework, comprising a body including several branch fittings such that the branch piece is a bypass manifold, whereby a connecting piece is arrangeable in the branch fitting and the branch piece includes a structural locking means made up of one or more parts for locking the connecting piece to the branch fitting, wherein the structural locking means is arranged to lock the connecting piece to the branch fitting without a threaded joint.

2. A branch piece as claimed in claim 1, wherein the structure of the bypass manifold forms a module system such that different connecting pieces are connectable in connection with the body of the bypass manifold.

3. A branch piece as claimed in claim 1, wherein the ends of the branch fittings of the body of the bypass manifold into which the connecting pieces are arranged are standard measure ones such that a part to be arranged in the branch fitting of the connecting piece is similar in every connecting piece.

4. A branch piece as claimed in claim 3, wherein several connecting pieces whose outlet fittings are different are arranged in the bypass manifold.

5. A branch piece as claimed in claim 1, wherein the connecting piece includes an outlet fitting for connecting a branch pipe or a pipework component.

6. A branch piece as claimed in claim 5, wherein the end of the connecting piece facing the body is rounded or bevelled.

7. A branch piece as claimed in claim 5, wherein the branch fitting includes an eccentric choke opening and the connecting piece includes an eccentric flow opening, enabling flow resistance to be adjusted by changing the position of the connecting piece.

8. A branch piece as claimed in claim 5, wherein the end of the connecting piece facing the body is provided with a sealing surface and a sealing member movable against the sealing surface is provided in connection with the branch piece for controlling the flow resistance.

9. A branch piece as claimed in claim 8, wherein the sealing surface of the connecting piece and the sealing member are conical.

10. A branch piece as claimed in claim 1, wherein the connecting piece is a pipework component.

11. A branch piece as claimed claim 1, wherein the locking means is a locking piece arranged to lock the connecting piece to the branch fitting.

12. A branch piece as claimed in claim 11, wherein the branch fitting includes a flange and the connecting piece includes a flange and the locking piece is arranged around the flanges.

13. A branch piece as claimed in claim 12, wherein the thermal expansion coefficient of the locking piece is equal to the thermal expansion coefficient of the flanges.

14. A branch piece as claimed in claim 12, wherein the thermal expansion coefficient of the locking piece is smaller than the thermal expansion coefficient of the flanges.

15. A branch piece as claimed in claim 1, wherein the branch piece is a bypass manifold for a tap water system.

16. A branch piece as claimed in claim 1, wherein the branch piece is a bypass manifold for a heating system.

17. A branch piece as claimed in claim 14, wherein the branch piece is a branch piece for a sprinkler system.

18. A branch piece as claimed in claim 1, wherein the branch piece includes at least one hole preform.

* * * * *